Patented Nov. 9, 1937

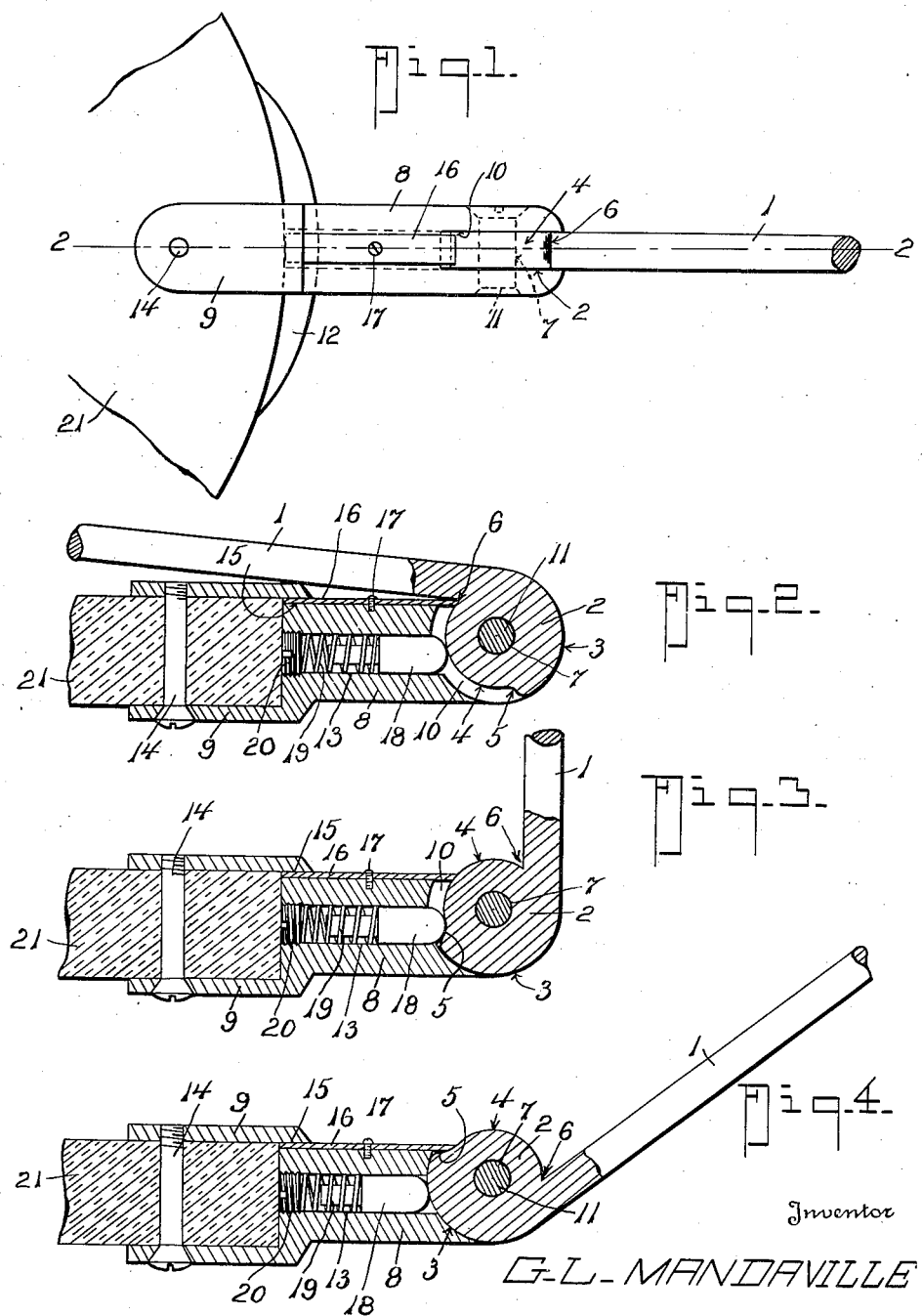

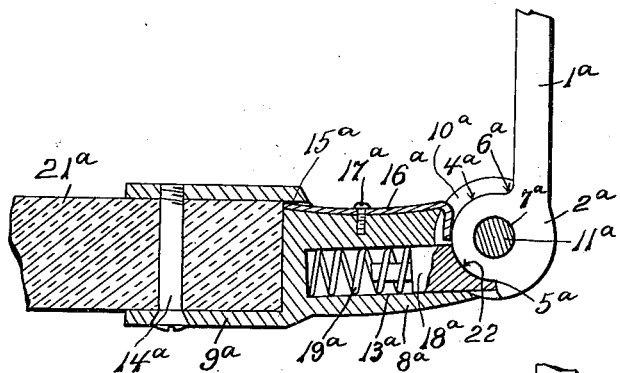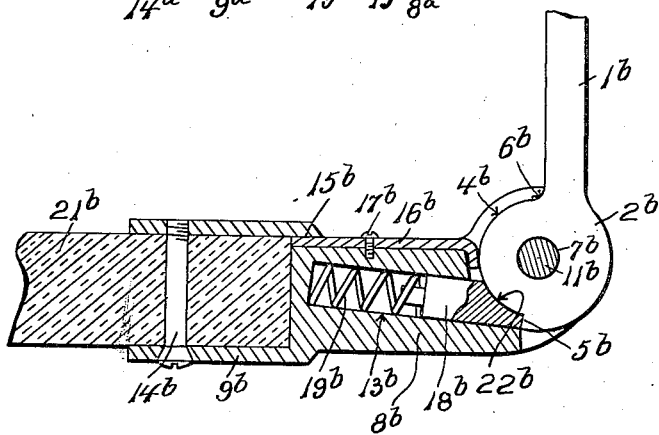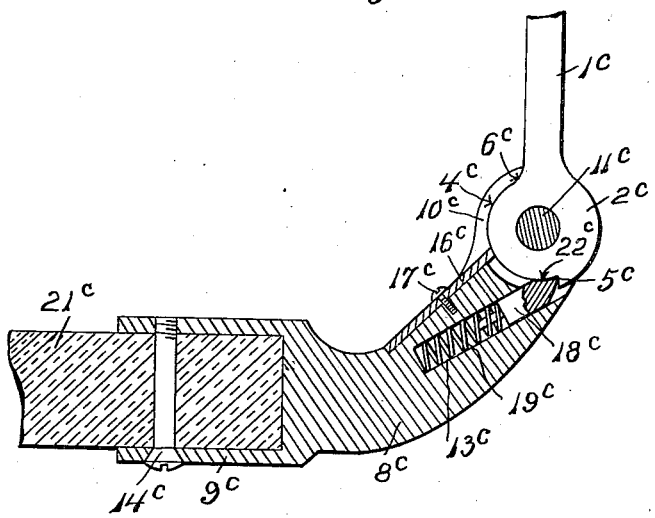

2,098,921

UNITED STATES PATENT OFFICE 2,098,921

SPECTACLE JOINT

Gurney Lee Mandaville, Fort Pierce, Fla.

Application May 8, 1935, Serial No. 20,491

10 Claims. (Cl. 88—53)

My invention, which relates to the art of optics, has special reference to spectacles and specifically to joints between the lens holders, or end pieces, and the temples for both rimmed and rimless mountings.

Primarily the invention has for its object to provide a construction by the employment of which breakage of the lenses by undue strain as applied by the temples through the end pieces on the lenses is avoided.

Further, it is an object to provide a means to assist in keeping the proper adjustment of the temple pressure against the wearer's face.

Further, it is an object to provide means to keep the temples from coming loose at the joints.

Further, it is an object to provide a spectacle joint which will not mar the beauty or greatly enlarge the present construction of the standard end piece.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Figure 1 is an enlarged detail elevational view from the face or inner side of a spectacle joint embodying the present invention, the temple being opened to the full position.

Figure 2 is a vertical, longitudinal section on the line 2—2 of Figure 1, with the temple folded down.

Figure 3 is a view similiar to Figure 2 with the temple in the position in which it is worn.

Figure 4 is a view similiar to views in Figures 2 and 3, but showing the temple in the position of Figure 1.

Figures 5, 6, and 7 respectively are views similar to Figure 3, showing the invention adapted to other shapes of spectacle ends.

In the drawings, in which like numerals of reference indicate like parts in all the drawings, 1 represents the temple whose flattened end 2 constitutes one element of a hinge joint. The flattened end 2 has a periphery of two radii, one radius forming a circular surface 3 of greater radius than the other 4, the two surfaces 3 and 4 merging at 5 in a stop shoulder. Where the surface 4 terminates adjacent the temple bar a seat 6 is formed. The seat cooperates with a stop 16 hereinafter again referred to.

The flat portion 2 is pivoted to and secured to the end piece 8 by a screw or rivet 11 which passes through the hole 7. The end piece comprises a barrel having straps 9. The barrel is bored at 13 to receive the push pin or plunger 18 whose head bears against the surfaces 3, 4, and 5 to keep the joint from exhibiting looseness, and to cooperate with the shoulder 5 as a normal stop to limit normal opening of the temple to a position approximately at right angles to the plane of the lens and the axis of the end piece 8 (see Figure 3).

The plunger 18 also cooperates with the temple to apply a sufficient tension thereto to hold the temple closely to the wearer's face. This function is accomplished by locating the axis of the plunger offset with respect to the axis of the pivot screw 11, as indicated in Figures 2 to 4, inclusive.

The end piece 8 has the entrant end of its bore 13 threaded and closed by a screw plug 20. A spring 19 serves to press the plunger 18 into contact with the surfaces 3, 4 and 5 of the flattened portion 2 of the temple 1, and because of the fact that the axis of the plunger 18 lies offset to the axis of the screw 11, as before indicated, this makes it possible to obtain a movement of the temple of sufficient amount for putting the spectacles on and off and yet give a good tension to hold the temples closely to the wearer's face.

The straps 9 extend over the lens 21 and are secured thereto by screws 14, there being guards 12 provided if desired to prevent swiveling on the screw 14. The outer end of the end piece 8 is slotted as at 10 to receive the flat portion 2 of the temple 1. The end piece 8 is also slotted as at 15 to permit insertion of a leaf spring 16 which is fastened to the end piece by a screw 17, and cooperates with the recess 6 of the temple 1 as a stop to limit the closing movement of the temple. It also serves in cooperation with the shoulder 5 as a limiting stop to limit the opening movement of the temple.

So far as described, it will be seen that when the temple 1 is opened to the normal position for use (see Figure 3) the plunger will be engaged by the shoulder 5 and will act as a stop as well as a hinge joint tension device to prevent looseness of the joint. Should, however, the temple swing outwardly beyond the normal open position, a thing which heretofore has often resulted in breakage of the lens, the plunger will be forced back and the temple will be permitted to swing to its farthest open position (see Figures 1 and 4), the movement being then limited by the spring 16 engaging with the shoulder 5.

In the embodiments of my invention shown in Figures 5, 6, and 7 the plunger has a friction surface indicated by 22 in Figure 5, in order to engage the surface 4a of the temple hinge and hold it in any position in which it may be placed by retaining friction. The plunger 18a in this embodiment of the invention also serves as a stop in cooperation with the shoulder 5a.

In Figure 5 those parts which correspond in purpose to like parts in the preceding figures bear the same reference number plus the index letter a; those parts in Figure 6 which correspond in purpose to like parts in the preceding figures have the same reference number plus the index letter b; while those parts in Figure 7 which correspond in purpose to like parts in the preceding figures bear the same reference number plus the index letter c; so a further detailed description of these modifications is thought to be unnecessary.

From the foregoing description, taken in connection with the accompanying drawings, it is thought that the construction and advantages of the invention will be clear to those skilled in the art to which it appertains.

What I claim is:

1. In spectacles, an end piece, means to secure the same to a lens, a temple hingedly connected to said end piece, said end piece having a bore and a slotted end, said temple having a flattened end to fit in said slotted end, a hinge pin passing through said slotted end and said flattened end, said flattened end having a peripheral surface comprising adjacent portions of two radii with a shoulder between them, and a spring pressed plunger in said bore to engage said peripheral surface.

2. In spectacles, an end piece, means to secure the same to a lens, a temple hingedly connected to said end piece, combined with means for limiting the unfolding movement of the temple to a normal position for use, said temple having a seat and a yieldable stop member carried by said end piece for engaging said seat to limit the folding movement of the temple.

3. In spectacles, an end piece, means to secure the same to a lens, a temple hingedly connected to said end piece, combined with means to exert a turning force on the temple tending to apply sufficient pressure to hold the temple bar in contact with the face of the wearer, said temple having a seat and a yieldable stop member carried by said end piece for engaging said seat to limit the folding movement of the temple.

4. In spectacles, an end piece, means to secure the same to a lens, a temple hingedly connected to said end piece, a spring pressed plunger located within said end piece and engaging the hinge part of said temple to take up looseness in the joint, said temple having a seat and a yieldable stop member carried by said end piece for engaging said seat to limit the folding movement of the temple.

5. In spectacles, an end piece, means to secure the same to a lens, a temple hingedly connected to said end piece, a spring pressed plunger located within said end piece and engaging the hinge part of said temple at a point offset from the hinge axis thereof, said temple having a seat and a yieldable stop member carried by said end piece for engaging said seat to limit the folding movement of the temple.

6. In spectacles, an end piece, means to secure the same to a lens, a temple hingedly connected to said end piece, said end piece having a bore and a slotted end, said temple having a flattened end to fit in said slotted end, a hinge pin passing through said slotted end and said flattened end, said flattened end having a peripheral surface comprising adjacent portions of two radii with a shoulder between them, and a spring pressed plunger in said bore to engage said peripheral surface, said temple having a seat and a stop member carried by said end piece for engaging said seat to limit the folding movement of the temple.

7. In spectacles, an end piece for attachment to a lens, said end piece having a bifurcated end, a temple having a flattened end located between the furcations of said bifurcated end, a hinge pin passing through said bifurcated and flattened ends, said end piece having a bore whose axis lies at right angles to and offset from said hinge pin's axis to engage the periphery of said flattened end, the periphery of said flattened end including two adjacent arcuate surfaces of different radii with a shoulder between the surfaces, said shoulder being so located as to limit the normal unfolding or opening movement of the temple to a direction approximately at right angles to the plane of the lens.

8. In spectacles, an end piece for attachment to a lens, said end piece having a bifurcated end, a temple having a flattened end located between the furcations of said bifurcated end, a hinge pin passing through said bifurcated and flattened ends, said end piece having a bore whose axis lies at right angles to and offset from the periphery of said flattened end including two adjacent arcuate surfaces of different radii with a shoulder between the surfaces, said shoulder being so located as to limit the normal unfolding or opening movement of the temple to a direction approximately at right angles to the plane of the lens, and a leaf spring secured to said end piece to overlie the space in which said flattened end is located, said temple having a seat to cooperate with said leaf spring for limiting the folding and unfolding extremes of movement of said temple on its hinge axis.

9. In spectacles, an end piece, means to secure the same to a lens, a temple hingedly connected to said end piece, combined with means, including a yieldable member and a stop cooperating therewith for limiting the unfolding movement of the temple to a normal position for use, said temple having a seat and a yieldable stop member carried by said end piece for engaging said seat to limit the folding movement of the temple.

10. In spectacles, an end piece, means to secure the same to a lens, a temple hingedly connected to said end piece, combined with means including a yieldable member and a stop cooperating therewith to exert a turning force on the temple tending to apply sufficient pressure to hold the temple bar in contact with the face of the wearer, said temple having a seat and a yieldable stop member carried by said end piece for engaging said seat to limit the folding movement of the temple.

GURNEY LEE MANDAVILLE.